Feb. 25, 1969 EIJI MIKI 3,430,148

PHASE COMPARATOR CIRCUIT FOR PROVIDING VARYING WIDTH SIGNAL WHICH IS A FUNCTION OF PHASE DIFFERENCE AND ANGLE OF TWO INPUT SIGNALS

Filed March 14, 1966

INVENTOR.
EIJI MIKI
BY Anthony O. Cennamo
Paul W. Fish
ATTORNEYS

IN PHASE

SLAVE SYNC LEADING

INVENTOR.
EIJI MIKI
BY Anthony D. Cennamo
Paul W. Fish
ATTORNEYS

SLAVE SYNC LAGGING

MID-POINT

MID-POINT

INVENTOR.
EIJI MIKI
BY Anthony D. Cennamo
Paul W. Fish
ATTORNEYS

United States Patent Office 3,430,148
Patented Feb. 25, 1969

3,430,148
PHASE COMPARATOR CIRCUIT FOR PROVIDING VARYING WIDTH SIGNAL WHICH IS A FUNCTION OF PHASE DIFFERENCE AND ANGLE OF TWO INPUT SIGNALS

Eiji Miki, Webster, N.Y., assignor to Xerox Corporation, Rochester, N.Y., a corporation of New York
Filed Mar. 14, 1966, Ser. No. 533,903
U.S. Cl. 328—133 8 Claims
Int. Cl. H03k *1/16*; H02p *5/50*

ABSTRACT OF THE DISCLOSURE

A synchronizing system which generates a varying width signal as a function of phase difference and angle between two input signals including logic circuitry for resolving a 180 degree out-of-phase condition.

This invention relates to improved electric circuits for determining the phase of two signals. More specifically, this invention relates to improved electric circuits for controlling the phase between at least two motors.

Very often it is desirable to operate in synchronism two motors which are spacially removed from each other. This synchronous condition is usually sought because the loads on the shafts of such motors must maintain a precise speed relationship with each other.

In an ideal situation, two identical motors will operate synchronously assuming all the factors which dictate a motor's operation are the same for each motor. However, in the practical situation, identity in design is difficult, if not impossible, to accomplish. Also, environmental factors at the situs of each motor effect that motor's operational characteristics. The differences between individual component characteristics for each motor's control circuits also contribute to altering a particular motor's operation. The variances in component characteristics can exist in new components while also occurring during the aging and use of the component. Various parameters such as line voltage may fluctuate randomly adding to the effect of other factors which alter the operation of the motor from the ideal situation.

In view of all these changing factors, when it is necessarry to insure synchronous operation of two motors, a link must be established between the motors in order to provide some indication of when and by what amount one motor is out of synchronism or out of phase with the other motor. However, this indication is not sufficient by itself for the link must also react to this signal of phase difference to provide a compensating effect on one of the motors. The complexity of the link and the physical distance usually between such motors necessitate the requirement that the connecting link be of an electronic nature. Such a link is called a synchronizing circuit. This circuit is generally characterized by two inputs each of which receive a synchronizing or sync signal from a respective motor which represents the condition of phase of the motor. The synchronizing circuit also has an output which provides a compensating signal to the control circuit of one of the motors to correct for an out of phase condition determined by the synchronizing circuit after a comparison of the phase of the sync signals. The sync signal from the motor distant from the sync circuit can be translated to the sync circuit either by direct electrical connection or by electromagnetic radiation. The mode of translation is usually dependent on the distance between the motors as well as the use to which the motors are put.

An exemplary application of two motors, which must operate in phase is in a facsimile transmission system. In a typical system there is usually a minimum of two stations, a transmitting or scanner station and a receiving or recorder station. At each station there is a motor which performs a specified task, depending on which station is involved. At the transmitting station, the motor may drive a conventional mechanical scanner which systematically scans an original, for example, a printed document. At the receiver station, a motor drives a mechanical recorder, for example, and a paper conveyor in such a manner to allow the recorder to print a facsimile of the original document on the paper. It is evident from the review of tasks to which the motors at both stations are put that synchronism in the operation of the motors is very desirable. If the motors become out of phase in their operation, the recorded facsimile of the original document at the receiver station will be distorted.

Generally, the operational characteristics of synchronous motors makes such motors highly desirable for use in facsimile systems. One characteristic of these motors which lend themselves to use in a facsimile system is their constant speed characteristic regardless of the load. Another important aspect is that the speed at which the motor operates is determined by the frequency of the applied voltage to the motor. This permits a simple and efficient motor speed control scheme by permitting the phase difference between two motors to control the frequency of an astable multivibrator. The output of the multivibrator then provides the applied voltage to the motor. As the motors become out of phase, a synchronizing circuit provides a signal which is indicative of the amount of missynchronization between the motors. This signal can be desirably used to make a compensating change in the frequency of the multivibrator controlling the motor. In this manner, a motor's speed may be increased or reduced in order to bring it in phase with another motor. However, as mentioned before, component characteristic changes in the multivibrator, for instance, can effect a mis-synchcronization. This obviously is undesirable.

It is an object, therefore, of this invention to provide improved motor synchronizing circuits.

It is another object of this invention to provide improved motor synchronizing circuits whereby changes in parameters of various components have little or no effect on such circuits to control the phase of the motors to be synchronized.

It is another object of this invention to provide improved motor synchronizing circuits whereby any missynchronization is corrected in a minimum of time.

It is a further object of this invention to provide improved circuits for accurately determining the relative phase between two signals.

For a better understanding of the invention as well as other objects and features thereof, reference may be made to the following description of the invention to be read in connection with the accompanying drawings wherein.

Figure 1:
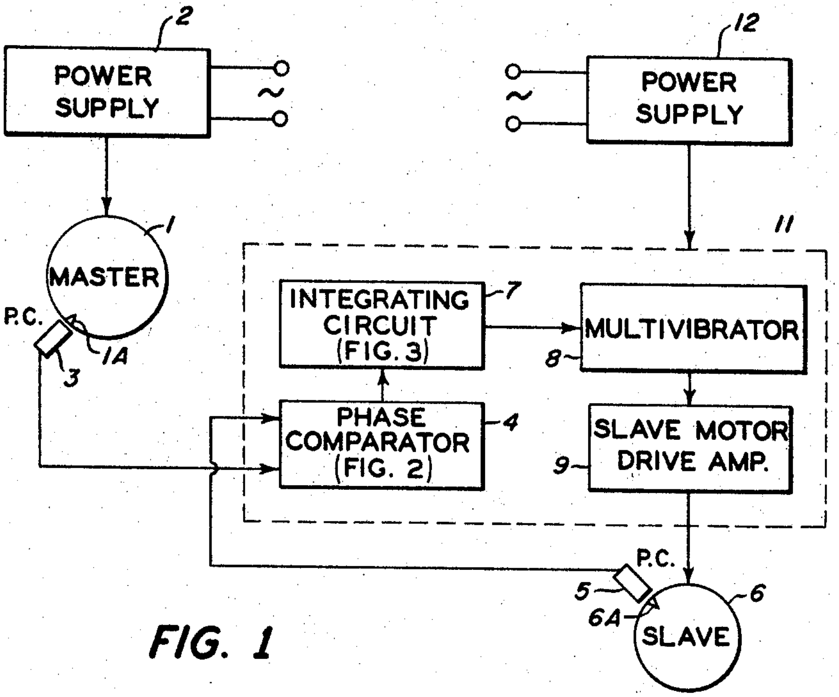
FIGURE 1 is a block diagram showing the overall system in which the present invention may be incorporated.

IN FIGURE 1, a system in which the disclosed invention may be used is illustrated. The system includes a motor 1, which will be referred to in this description as the master motor, which is supplied energy from a power source 2. A synchronizing signal referred to as the master sync, is generated, for example, from photocell 3 which detects a bench mark 1A which is located suitably on the master motor. This master sync pulse is supplied to one input of phase comparator circuit 4 which also receives a synchronizing signal, referred to as the slave sync, from photocell 5 which detects a bench mark 6A located on motor 6, which will hereinafter be referred to as the slave motor. Phase comparator circuit 4 compares the phase differences between the master and slave syncs and accordingly provides a signal indicative of the sense and degree of phase difference to integrating circuit 7. Sense of the phase difference indicates whether the slave sync is leading or lagging the master sync. This integrating circuit will be referred to in more detail hereinafter. The effect of the output signal from phase comparator 4 on integrating circuit 7 is to effectively change the voltage level at the output terminal thereof which controls the frequency of multivibrator 8 which is a conventional astable multivibrator. The output from multivibrator 8 is amplified by conventional slave motor drive amplifier 9 and this amplified output is supplied as power to slave motor 6. It is seen therefore that the relative phase between the two motors controls the voltage level output of integrating circuit 7 to effectively maintain the frequency of multivibrator 8 at such a value that slave motor 6 will operate in phase with the master motor 1. The circuits of FIG. 1 enclosed in dashed box 11 are symbolically shown to be energized by energy from power supply 12. Phase comparator circuit 4 is shown in greater detail in FIGURE 2.

Figure 2:
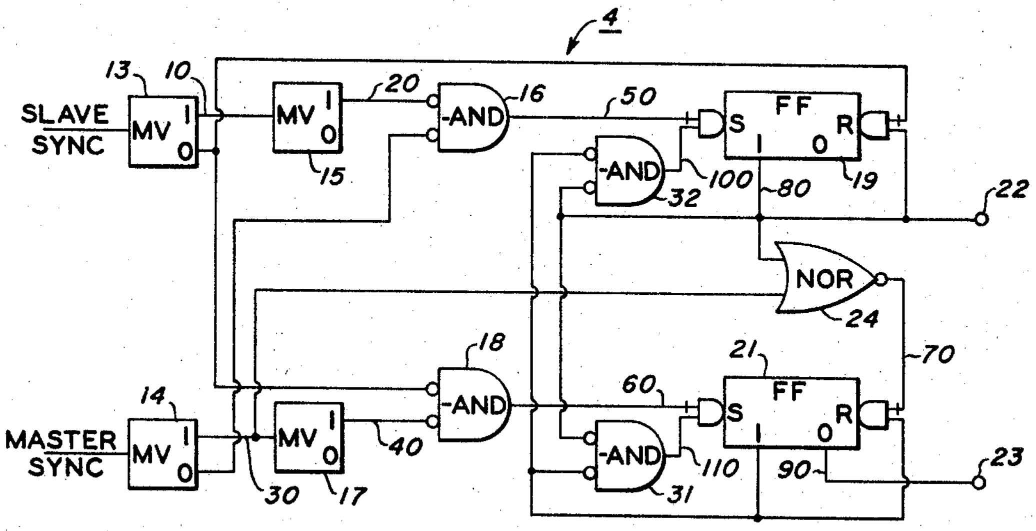
FIGURE 2 is a schematic diagram of the phase comparator circuit in accordance with the present invention.

Before reference is made to the operation of the circuit in FIGURE 2, certain terms and other fundamentals should be established. The multivibrators and flip-flops in the circuit of FIGURE 2 are of such a nature as to be set and reset, where applicable, by positive pulses. A positive pulse is defined as a change in potential from one level to a more positive level. Therefore, a negative pulse is defined as a change in potential from one level to a more negative level. The multivibrators are of the monostable type and are considered to be in the reset condition at the beginning of the operation of the circuit, as are the flip-flops. The gates (not numbered) at the set and reset inputs of the flip-flops have clock and DC level inputs. The former input, which is designated by the short line intersecting the input conductor to this gate, will be enabled only by a positive pulse while the DC level input is enabled by the presence of a DC signal of a predetermined high level. The negative AND gates in this circuit are of such a nature as to provide a low level output upon the coincidence of two high level inputs or any combination of high and low level inputs. A high level output will be produced only upon the coincidence of two low level inputs. The NOR gate in this circuit is of such a nature as to produce a low level output for every combination of low and high level inputs except when both inputs are of a low level. Examples of suitable flip-flop and multivibrator design for utilization in the circuit of FIGURE 2 are shown in Harmon Kardon's publication, "Digital Logic," Catalog No. 515. The negative AND and NOR gates also shown in FIGURE 2 are of conventional design and an example is also set forth in the aforementioned catalog. Although particular reference is made to the catalog design, it is to be understood that any conventional design may be used.

Figure 3:
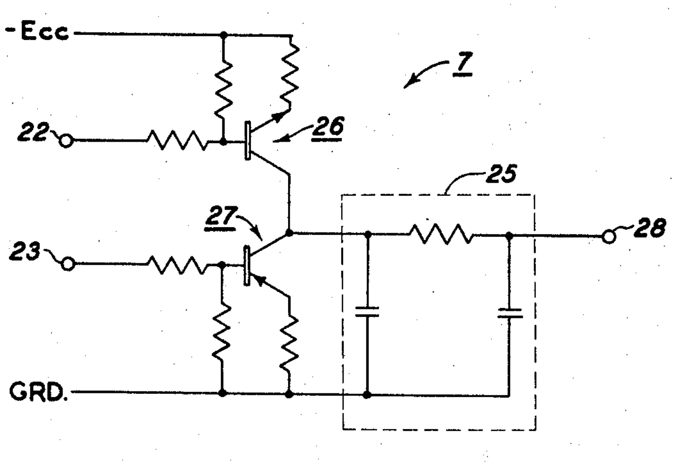
FIGURE 3 shows an integrating circuit which may be utilized in the overall system as shown in FIGURE 1.

Reference is now made to the operation of the circuit of FIGURE 2 in relation to the waveforms as shown in FIGURES 4A–E and the circuit of FIGURE 3. The reference numerals in FIGURE 2 denoting various conductors between components correspond to similarly designated waveforms in FIGURES 4A–E present at these points of the circuit.

The circuit of FIGURE 2 represents phase comparator 4 as mentioned in the description of FIGURE 1, and and as previously stated, has two inputs to which are applied the slave and master syncs generated by their respective photocells. The slave sync and the master sync provide the inputs which set multivibrators 13 and 14, respectively. The pulses from the one outputs of multivibrators 13 and 14 are shown respectively as waveforms 10 and 30 in FIGURE 4A. This figure represents the waveforms corresponding to the operation of the phase comparator 4 when master motor 1 and slave motor 6 are operating in phase.

The positive pulse in waveform 10 from the one output of multivibrator 13 sets multivibrator 15 which, in turn, generates a positive pulse as shown in waveform 20 which provides one input to negative AND gate 16. During this time, the positive pulse in waveform 30 from the one output of multivibrator 14 sets multivibrator 17 which provides a positive pulse as shown in waveform 40 at the one output thereof. This positive pulse provides one input to negative AND gate 18. The other input of negative AND gates 16 and 18 is provided from the zero outputs of multivibrator 14 and 13 respectively. It is seen from the waveforms in FIGURE 4A that when the master and slave motors are in phase the outputs from the negative AND gates 16 and 18 are unchanged from the low level signal present at the outputs of these gates before the operation of the circuit was initiated. Without a change in signal level at the outputs of negative AND gates 16 and 18, the set input gates (not numbered) to flip-flops 19 and 21 remain unenabled. This permits flip-flops 19 and 21 to remain in their reset condition.

The one output of flip-flop 19 provides a low level signal at output terminal 22 while the zero output of flip-flop 21 provides a high level signal at output terminal 23. The signal level at output terminals 22 and 23 remain at their particular level as long as flip-flops 19 and 21 remain in the reset condition. These levels will be referred to as normal levels for these flip-flops.

As is well known in the art, the pulse from the zero output of multivibrator 13 has no effect on flip-flop 19 since this flip-flop is in the reset condition upon reception of this pulse at its reset input gate (not numbered). Similarly, the output from NOR gate 24 has no effect on the reset condition of flip-flop 21.

Output terminals 22 and 23 of the circuit of FIGURE 2 correspond to the input terminals bearing the same reference numerals in integrating circuit 7 of FIGURE 3. This integrating circuit comprises a time constant circuit generally shown enclosed in the dashed box 25. The time constant of this circuit is very short to permit a rapid change in voltage level corresponding to a detected out-of-phase condition between the master and slave motors. The integrating circuit is represented by two complementary transistors 26 and 27 which act as constant current sources for charging and discharging time constant circuit 25 depending on the signal level at terminals 22 and 23. In this manner, the amount of charge gained or lost in time constant circuit 25 will be proportional to the pulse width of the signal applied to either input terminal 22 or 23. It should be noted that the normal signal levels at output terminals 22 and 23 from flip-flops 19 and 21, respectively, are of sufficient magnitude and polarity to bias transistors 26 and 27, respectively, in their nonconducting region. Therefore, it is seen that when master and slave sync pulses arrive simultaneously to the phase comparator circuit 4 the voltage level at the output terminal 28 of integrating circuit 7 is unchanged. This permits the the astable multivibrator 8, as referred to in the description of FIGURE 1, to maintain operation at its then present frequency thereby insuring that the speed and phase of slave motor 6 is not changed.

It is seen from the above paragraph that the operation of the phase comparator circuit 4 of FIGURE 2 is rather simple in the case when the master and slave motors are operating in phase. In order to provide a better understand of the invention, the operation of the circuit will now be described for a situation in which the slave sync is leading the master sync. The operation of the phase comparator circuit will not be described in detail as regards every aspect of the operation, but merely those facets of the operation which differ from the operation during the in phase mode.

In explaining the operation of the phase comparator circuit when the slave sync is leading the master sync, reference will be made to the waveforms of FIGURE 4B which correspond to this phase condition.

The comparison of the waveforms of 4B will show that the pulses in waveform 10 and 20 are out-of-phase with pulses in waveforms 30 and 40. This phase difference represents substantially the phase difference between the master and slave motors. The pulses from the one outputs of multivibrators 15 and 17 as shown in waveforms 20 and 40, respectively, referred to hereinafter as standard pulses, provide one input to negative AND gates 16 and 18, respectively. The other input to these gates is supplied from the zero output of multivibrators 13 and 14, respectively. As is seen from waveform 50, the output of negative AND gate 16 remains unchanged, thereby permitting flip-flop 19 to stay in its reset condition. However, the output of negative AND gate 18 as seen in waveform 60 in FIGURE 4B shows that, at a time coincident with the positive pulse in waveform 10 from the one output of multivibrator 13, a positive pulse is generated which is supplied to the clock input of the set input gate of flip-flop 21. The DC level input of the set input gate of flip-flop 21 is connected to the output of negative AND gate 31. This output is represented by waveform 110 in FIGURE 4B. As is shown in that waveform, this input to the set input gate of flip-flop 21 is enabled at a time in which the positive pulse in waveform 60 is present at the clock input of the set input gate of flip-flop 21. The coincidence of these two inputs permits flip-flop 21 to be set by the positive pulse in waveform 60. The setting of flip-flop 21 provides a change in signal at its one output from its normal low level to a higher level. This higher level signal is applied to the DC level input of the reset input gate of flip-flop 21. At the same time, the normally high level signal at the zero output of flip-flop 21, which is connected directly to output terminal 23, assumes a lower level. As is understood from the above discussion of integrating circuit 7 of FIGURE 3, this change in signal level at input terminal 23 causes the time constant circuit 25 to discharge porportionally thereby reducing the voltage level at output terminal 28. This reduction in voltage level effects a change in operating frequency of astable multivibrator 8 and consequently a reduction in the speed of slave motor 6. The amount of discharge of the time constant circuit 25 of the integrating circuit of FIGURE 3 is dependent upon the phase difference between the master and slave sync pulses.

Figure 4A:
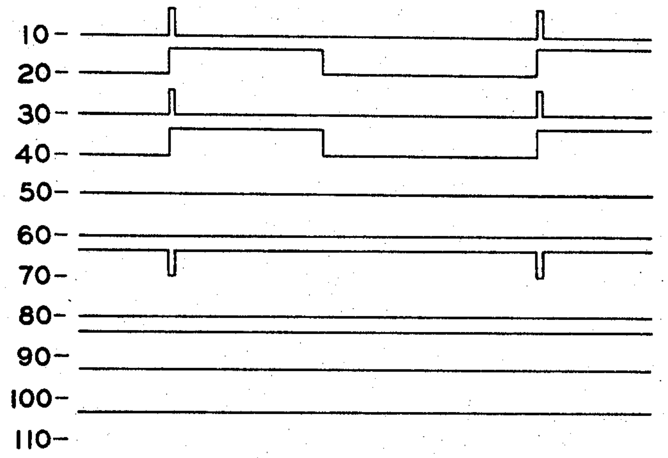
FIGURES 4A through 4E illustrate waveforms which are helpful in understanding the operation of the circuit of FIGURE 2.
Figure 4B:
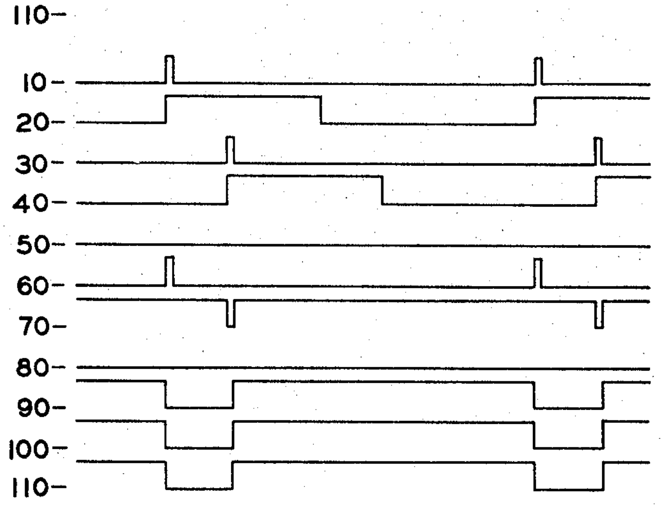

NOR gate 24 is provided with two inputs, one of which is from the one output of flip-flop 19 which is at a normally low level as indicated by waveform 80 in FIGURE 4B, while the other input is from the one output of multivibrator 14 which is represented by waveform 30. It will be seen from waveforms 80 and 30 that a positive pulse will be supplied to the clock input of the reset input gate of flip-flop 21 from the output of NOR gate 24 upon the reception of the negative pulse of waveform 30 at the input to NOR gate 24. This negative pulse is gated through NOR gate 24 as a positive pulse, thereby resetting flip-flop 21 and returning the previously low level signal at output terminal 23 to its normally high level. This terminates the discharging of time constant circuit 25.

The operation of the phase comparator circuit of FIGURE 2 for the situation in which the slave sync is lagging the master sync is quite similar to the operation as just described. However, there is a slight difference in operation which will be described briefly. That difference is found in the manner in which flip-flop 19 is reset by the positive pulse from the zero output of multivibrator 13. Reference is made to the waveforms of FIGURE 4C which correspond to this phase condition. As is seen in these waveforms, particularly waveform 80, the signal level at output terminal 22 is changed from a normally low level to a high level and stays at this high level for a duration which corresponds substantially to the phase difference between the two sync pulses.

From the above-described operation of the phase comparator circuit of FIG. 2, the width of the standard pulses from multivibrators 15 and 17 should be of a width which is slightly less than half of the sync pulse period. In this manner, a suitable input to negative AND gates 16 and 18 is provided by which these logic components can detect the sense of the phase difference.

However, because of the widths of the standard pulses generated by multivibrators 15 and 17, the phase comparator circuit of FIGURE 2 may detect a phase condition in which the master and slave motors are out-of-phase by 180 degrees and be unable to decide the obvious ambiguity of this situation as to whether or not the master motor is leading or lagging the slave motor. This ambiguity is resolved by the function of the negative AND gates 31 and 32 and NOR gate 24. It can be readily seen that such an ambiguous 180 degrees out-of-phase condition, or midpoint condition as it will be referred to hereinafter, may occur in four different situations. Immediately prior to this midpoint condition, the last detected out-of-phase condition could have had the slave sync lagging the master sync. Another situation may occur where the last detected phase difference involved a leading slave sync pulse. A third and fourth situation would occur when the midpoint condition immediately follows a situation where the two motors are operating in phase. These last two situations are different from each other depending on whether the slave sync is leading or lagging.

To illustrate the function of negative AND gates 32 and 31 and NOR gate 24, it is sufficient that one of these situations in which there is 180 degrees phase difference be explained. Explanation of such a situation will now be made with reference to the circuit of FIGURE 2 and the waveforms illustrated in FIGURE 4D. It is understood that the phase comparator circuit of FIGURE 2 has, immediately prior to this 180 degree phase difference, just corrected the phase of slave motor 6 from a lagging condition. In this prior state, the signal at output terminal 22 from the one output of flip-flop 19 is at a high level. This high level signal at output terminal 22 has charged the time constant circuit 25 of integrating circuit of FIGURE 3 to such a voltage level as to make a compensation in the operating frequency of astable multivibrator 8, as already described. It is seen in FIGURE 2 that negative AND gates 16 and 18 have both passed positive pulses as shown in waveforms 50 and 60, respectively. These waveforms, it will be noted, are coincident to the positive pulse in waveforms 30 and 10 from the one outputs of multivibrators 14 and 13, respectively. Because of the fact that the signal level at the one output of flip-flop 19 is of a high value, the input to negative AND gate 31, which is also connected to the one output of flip-flop 19, is unenabled. Therefore, it is seen from waveform 110 that the DC level input to the set input gate of flip-flop 21 is also unenabled. This input condition makes it impossible for the positive pulse in waveform 60 from the output of negative AND gate 18 to set flip-flop 21. Coincident with the trailing edge of the positive pulse in waveform 60 is the positive pulse from the zero output of multivibrator 13 which enables the clock input of the reset input gate of flip-flop 19 thereby resetting flip-flop 19 and providing a low level signal at the one output of this flip-flop. This low level signal at the one output of flip-flop 19 enables one of the inputs of negative AND gate 32. The other input of negative AND gate 32 is connected to the one output of flip-flop 21 which is also at a low level. This low level signal enables the corresponding input to negative AND gate 32 thereby providing at the output of negative AND gate 32 an enabling signal for the DC level input to the set input gate of flip-flop 19. This enabling condition at one input to the set input gate of flip-flop 19 permits the positive pulse in waveform 50 from the output of negative AND gate 16 to set flip-flop 19 thereby changing the signal level at its one output from a normally low level to a higher level. This higher level output signal is connected to output terminal 22 and consequently to the integrating circuit of FIGURE 3 to effect the changing of a time constant circuit 5. This increases the voltage level at output terminal 28 of time constant circuit 25 and changes the speed of slave motor 6 bringing it into phase with master motor 1. Flip-flop 19 is reset by the positive pulse from the zero output of multivibrator 13 which is connected to the clock input of the reset input gate of flip-flop 19, the other input of the reset input gate being enabled by the high level output signal from the one output of flip-flop 19. This resetting of flip-flop 19 returns the signal level at its one output from a high level to the normally lower level.

The operation of the phase comparator of the circuit of FIGURE 2 for the other aforementioned situations where midpoint condition occurs is very similar to that just described. The waveforms of FIGURE 4E correspond to a condition in which a slave sync leading phase condition has just been compensated for by the phase comparator circuit and the slave and master syncs are 180 degrees out-of-phase. The waveforms for the situation in which midpoint condition occurs after a previous in-phase condition are represented by those portions of the waveforms in FIGURES 4D and 4E which are to the right of dashed lines 34 and 35, respectively.

To summarize the function of negative AND gates 31 and 32 in the four situations of phase sense ambiguity, it is sufficient to state that these gates are so arranged in the phase comparator circuit as to act to inhibit one flip-flop from being set when the other flip-flop is in its set condition. In this manner, the phase comparator circuit of FIGURE 2 arbitrarily treats one sync pulse as leading the other sync pulse and adjusts the phase of slave motor 6 accordingly. This is clearly seen from the above explanation of the phase comparator circuit operating in accordance with the waveforms of FIGURE 4D.

Figure 4C:
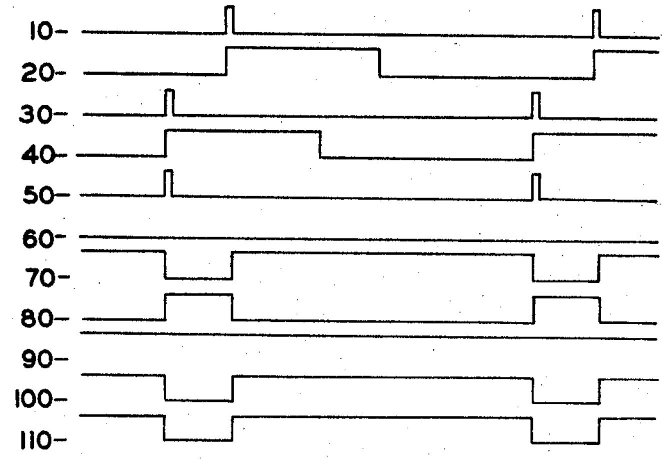
Figure 4D:
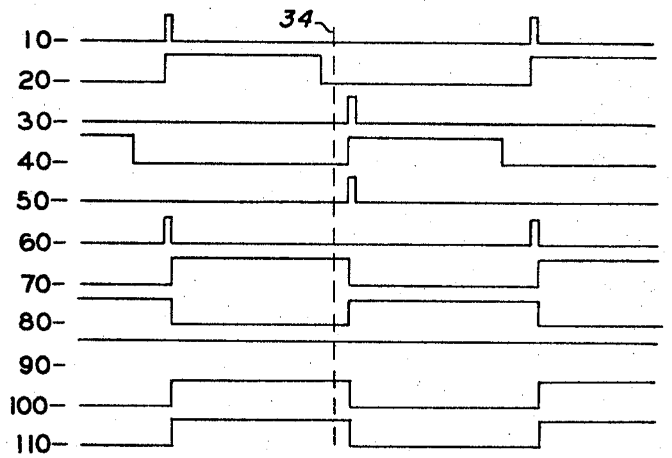
Figure 4E:
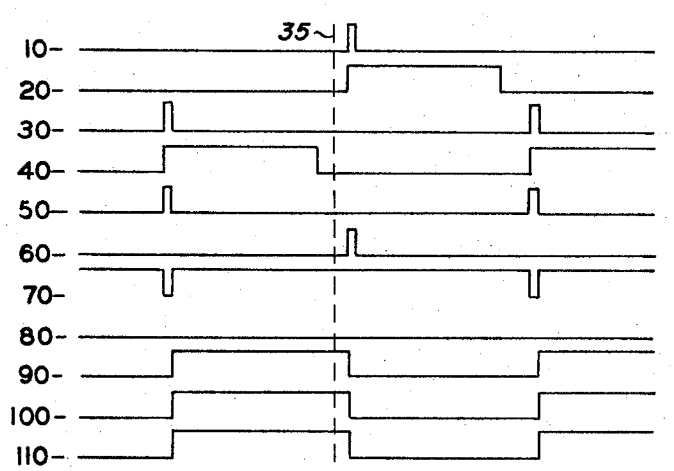

It should be observed that the width of the charging or discharging pulses as shown in waveforms 80 or 90, respectively, in the waveforms of FIGURES 4B through 4C correspond actually to the phase difference between the leading edges of the slave and master sync pulses plus the width of the positive pulse from the output of either multivibrator 13 or 14, depending on whether or not the slave motor is leading or lagging. In view of this, it is very desirable to make these pulse outputs from multivibrators 13 and 14 of a very short duration.

The operation of the phase comparator circuit of FIGURE 2 can be summarized as follows: negative AND gates 16 and 18 determine which of the two sync pulses arrive at the input of the phase comparator circuit first and a pulse representative of this first received sync pulse is passed by one of these negative AND gates. This pulse acts to set the appropriate flip-flop thereby effecting a speed change in the controlled motor. The sync pulse which arrives after the first received sync pulse resets this flip-flop, thereby terminating the pulse generated by this flip-flop after a duration substantially equal to the phase difference between the two received sync pulses. This pulse which is indicative of the phase difference will be of either two polarities depending upon whether or not the out of phase condition is leading or lagging as concerns the slave motor with respect to the master motor. Depending upon this phase condition, the voltage level at the output of integrating circuit 7 is increased or decreased to consequently affect the operating frequency of astable multivibrator 8. This change in frequency of the applied power to the slave motor will either act to increase or decrease the speed of that motor to bring it into phase with the master motor. In this manner, it is seen that any variation in component characteristics will be automatically compensated for and correct phasing between the master and slave motors will be maintained.

While the invention has been described with reference to the circuit disclosed herein, it is not confined to the details set forth since is is apparent that certain electrical equivalent components may be substituted for the components of the preferred circuit without departing from the scope of the invention. Thus, for example, multivibrators and gates may be replaced with other combinations of components to perform the same function as those obtained in the circuit shown in FIGURE 2. Therefore, the monostable multivibrators could be replaced with bistable components which could be reset by suitable clock pulses.

Although reference has been made earlier to the use of a synchronous motor, it is obvious that the present synchronizing circuit could be easily adaptable to any motor whose speed is dependent upon the frequency of the applied power to the motor. It should also be understood that, although the phase comparator circuit of FIGURE 2 is described in a motor synchronizing system, it will be apparent to those skilled in the art that this phase comparator circuit has useful application in other systems.

The intention of the applicant is, therefore, to cover such modifications or changes as may come within the scope of the invention as defined by the following claims.

What is claimed is:

1. A control circuit for determining the degree and sense of phase difference between first and second periodic signals comprising:

(a) first and second pulse means each having first and second output terminals and being responsive to said first and second signals, respectively, for generating first and second pulses;

(b) first and second means coupled to said first output terminal of said first and second pulse means, respectively, and being responsive to said first and second pulses for generating first and second standard pulses;

(c) first logic means for comparing the time relation of said first standard pulse and said second pulse;

(d) second logic means for comparing the time relation of said first pulse and said second standard pulse;

(e) two output terminals;

(f) first bistable means coupled to said first logic means for generating at one of said two output terminals a control signal having a predetermined polarity indicative of a one of two sense relationships between said first and second signals; and, (g) second bistable means coupled to said second logic means for generating at the other of said two output terminals a control signal having a polarity opposite said predetermined polarity indicative of the other sense relationship between said first and second signals.

2. The control circuit according to claim 1:

(a) wherein the widths of said first and second standard pulses are substantially equal in duration to slightly less than one half of the period of said second pulses; and, (b) further comprising (1) first means coupled between said second output terminal of said first pulse means and said first bistable means to trigger said first bistable means from one stable state to the other stable state in response to said first pulse; and, (2) second means coupled between said first output terminal of said second pulse means and said second bistable means to trigger said second bistable means from one stable state to the other stable state in response to said second pulse.

3. A control circuit according to claim 2 wherein said second coupling means includes logic means responsive to the control signal at said one of said two output terminals and to said second pulse.

4. A control circuit according to claim 2 further including:

(a) gate means having two input terminals and two gate output terminals;
(b) means for coupling one of said input terminals to said one output terminal,
(c) means for coupling the other of said input terminals to said outer output terminal;
(d) means coupled between said two gate output terminals and said first and second bistable means, respectively, for preventing triggering of one of said bistable means from said other stable state to said one stable state when the other of said bistable means is in said one stable state.

5. A phase comparator for determining phase relationship between corresponding pulses from a first source of periodic pulses and from a second source of periodic pulses wherein said pulses are of substantially similar pulse repetition frequency comprising:
(a) first and second pulse generating means responsive to pulses from said first and second sources respectively for generating timing signals of a predetermined pulse width;
(b) first and second logical gating means responsive to said timing signals and to first and second standard pulses having equal widths for generating a phase signal indicative of the phase angle of said pulses from one of said sources relative to corresponding pulses from the other of said sources, said standard pulses having a width equal to substantially one-half the period of said periodic pulses; and
(c) first and second bistable indicator means responsive to said phase signal and said timing signals for generating at one of a pair of output terminals at least one signal the duration of which is proportional to the degree of mis-synchronization between corresponding pulses of said first and second pulse sources.

6. A phase comparator for determining phase relationship between corresponding pulses from a first source of first periodic pulses and from a second source of second periodic pulses wherein said pulses are of substantially similar pulse repetition frequency comprising:
(a) first and second gate pulse means responsive to said first and second periodic pulses and to first and second standard pulses for generating a phase signal indicative of the phase angle of corresponding ones of said first and second pulses, said standard pulses each having a width substantially equal to one-half the period of said periodic pulses;
(b) first and second bistable indicator means responsive to said phase signal and said first and second periodic pulses for generating at one of a pair of output terminals at least one signal, the duration of which is proportional to the degree of phase displacement between corresponding ones of said first and second periodic pulses.

7. A phase comparator as defined in claim 6 wherein said gate pulse means includes a first and second standard pulse generating means responsive to said first and second periodic pulses for generating said first and second standard pulses.

8. A phase comparator as defined in claim 6 including gating means responsive to the condition of said first and second bistable means for inhibiting the response of one of said bistable means during the generation of said one signal at said one output terminal.

References Cited

UNITED STATES PATENTS

| | | | |
|---|---|---|---|
| 3,327,226 | 6/1967 | Nourney | 328—109 |
| 3,328,688 | 6/1967 | Brooks | 328—133 X |

ARTHUR GAUSS, *Primary Examiner.*

S. D. MILLER, *Assistant Examiner.*

U.S. Cl. X.R.

318—85; 328—155; 307—232, 215, 218, 229, 262, 295